(12) United States Patent
Pyle (10) Patent No.: US 8,755,919 B2
(45) Date of Patent: Jun. 17, 2014

(54) PUSHBUTTON RADIO FREQUENCY IDENTIFICATION TAG FOR MEDIA CONTENT DELIVERY

(75) Inventor: Hugh Francis Pyle, Salem, MA (US)

(73) Assignee: Microsoft Corporation, Redmond, WA (US)

( * ) Notice: Subject to any disclaimer, the term of this patent is extended or adjusted under 35 U.S.C. 154(b) by 1384 days.

(21) Appl. No.: 12/047,332

(22) Filed: Mar. 13, 2008

(65) Prior Publication Data

US 2009/0234472 A1 Sep. 17, 2009

(51) Int. Cl.
*G06F 17/00* (2006.01)

(52) U.S. Cl.
USPC .......................................................... 700/94

(58) Field of Classification Search
USPC .......................................... 700/94; 340/10.1
See application file for complete search history.

(56) References Cited

U.S. PATENT DOCUMENTS

| | | | |
|---|---|---|---|
| 6,967,566 B2 | 11/2005 | Weston et al. | |
| 7,924,141 B2 * | 4/2011 | Tuttle | 340/10.1 |
| 2005/0246738 A1 | 11/2005 | Lockett et al. | |
| 2005/0273553 A1 | 12/2005 | Boucard | |
| 2006/0255131 A1 | 11/2006 | Stewart | |
| 2006/0258289 A1 | 11/2006 | Dua | |
| 2007/0109101 A1 * | 5/2007 | Colby | 340/10.4 |
| 2007/0152828 A1 | 7/2007 | Mohalik | |
| 2008/0129485 A1 * | 6/2008 | Tuttle | 340/539.11 |
| 2008/0136647 A1 * | 6/2008 | Brown | 340/572.8 |
| 2009/0085724 A1 * | 4/2009 | Naressi et al. | 340/10.6 |
| 2009/0115573 A1 * | 5/2009 | Naressi et al. | 340/10.1 |
| 2009/0315670 A1 * | 12/2009 | Naressi et al. | 340/5.8 |

FOREIGN PATENT DOCUMENTS

WO 2005081087 A1 9/2005

OTHER PUBLICATIONS

Adair, "Radio Frequency Identification (RFID) Power Budgets for Packaging Applications", Date: Nov. 30, 2005, pp. 1-13.
Sokoler, et al., "VideoTable: A Tangible Interface for Collaborative Exploration of Video Material During Design Sessions", Conference on Human Factors in Computing Systems, CHI '02 extended abstracts on Human factors in computing systems, Minneapolis, Minnesota, USA, Poster Session: Interactive Posters, Date: 2002, pp. 656-657.

* cited by examiner

*Primary Examiner* — Andrew C Flanders
(74) *Attorney, Agent, or Firm* — Micah Goldsmith; Glen Johnson; Micky Minhas (57) ABSTRACT

A media token with a pushbutton RFID (Radio Frequency Identification) tag which, when activated by a button press, enables a globally unique identifier ("GUID") encoded in the tag to be read by an RFID reader that is operatively coupled to a client device. The GUID is resolved by an on-line media content service which identifies media content that is associated with the media token. The service streams the content to the client device, or delivers it for local storage which is rendered by the client device. Since the press of the button causes the content to begin playing, an association is created between the media token and the rendered content. However, the media token itself does not function as a content container, but instead provides a convenient way to control content playback while functioning as a physical vehicle that can be packaged, touched, and shared much like traditional media.

6 Claims, 7 Drawing Sheets

PUSHBUTTON RADIO FREQUENCY IDENTIFICATION TAG FOR MEDIA CONTENT DELIVERY

BACKGROUND

The development of media content in digital form has created new ways for consumers to access and experience video and audio content. With more than one billion people on-line, and broadband Internet access becoming more widely available in United States and international markets, enjoying digital media content is becoming much faster and easier. Consumers can now stream media content, or download and play content on a large number of electronic devices with a level of quality that increasingly matches traditional high-quality home theatre and audio systems.

A variety of different business models may be used for delivering media content, and consumers can typically choose from among large catalogs and get the content delivered quickly and conveniently from the on-line source whenever they want it. Consumers like the quality, choice, and flexibility that digital delivery provides, and continued growth and demand is anticipated. Some analysts point to such growth as partly contributing to the decline of sales of music that is physically delivered on CD (Compact Disc). And while DVDs (Digital Versatile Discs) currently continue to be a preferred way for consumers to access and consume video such as feature films and movies, on-line video delivery is expected to experience very significant growth in the future, particularly as bandwidth availability improves and effective Internet acceleration and traffic management techniques continue to be developed and deployed.

While digital media content delivery is very popular and proving to be commercially successful, some consumers continue to prefer physically embodied media content and its traditional packaging. For these consumers, digital media content does not provide the kind of close and personal interaction that results when one has a physical object to look at, touch, and hold and which can further reinforce a sense of ownership.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A media token with a pushbutton RFID (Radio Frequency Identification) tag is arranged so that, when activated by a consumer pressing the button, a globally unique identifier ("GUID") encoded in the RFID tag may be read by an RFID reader that is operatively coupled to a client device such as a media center PC (personal computer), game console, home entertainment system, or set-top box. The GUID is resolved by an on-line media content service which identifies media content such as music or video that is associated with the media token. For a first time activation of the pushbutton RFID tag, the service streams the media content to the client device, or delivers it for local storage along with metadata that describes the usage rights for the content. The client device then renders the media content from the stream or local store. On subsequent activations, the client device will perform a look-up in a local database to identify applicable usage policy and locate the media content in the local store, and then render the content from the store without having to contact the on-line media service again.

Since the press of the button on the media token causes the media content to begin playing on the client device, an association for the consumer is created between the physically embodied media token and the rendered content. However, the media token itself does not function as a container for the media content (which instead comes from the service), but instead provides a convenient way to control playback of media content while also functioning as a physical vehicle that can be packaged, touched, and shared much like traditional media.

In various illustrative examples, the media token is embodied as a card having the approximate size and shape of a playing card. The pushbutton RFID tag is configured as a low cost passive tag that contains no internal power supply but instead relies on power emitted by the RFID reader coupled to the client device. The media card may include text, graphics, images, and other information that describes the media content that is associated with it, and/or may also convey other information such as promotional and marketing messages or offers. A variety of distribution models for media cards are supported including sale at retail outlets and promotional distribution through direct mail, viral marketing using existing social networks, or via hand-outs at events such as concerts and movies. Media content associated with the media card can also be protected under various digital rights management ("DRM") methodologies to guide how content may be transferred, for example, to other devices like portable media players, and/or to limit play count in some cases. However, the DRM rules do not have to be embedded in the media card itself, but instead may be determined through resolution of the GUID alone, or in combination with other identifying data such as a customer account ID or login, and then enforced at the local client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

A significant challenge presented by digital delivery of media content is that some consumers have bemoaned the loss of something tangible to look at or hold after, for example, buying and downloading a song from on on-line source, and may also express a diminished sense of ownership. That is, CDs and DVDs and their associated cases or packaging give physicality to media content that is otherwise intangible, and can provide both a visual and tactile sense to the consumer that the media content exists beyond merely being a collection of digital ones and zeroes. Without a physically manifested form, the digitally delivered media content is listened to, or watched, but then is gone. The consumer is thus limited in pursuing the kinds of interaction with the digital media content that may be traditionally performed with their physically embodied counterparts.

For example, consumers often enjoy browsing through their CD or DVD collections by pulling a case from the shelf and perhaps viewing the artwork or images on the cover, looking at the content list and description, artist/actor information, etc. CDs and DVDs are also frequently packaged with additional printed collateral such as liner notes, booklets, lyrics, and biographies. Special editions and "boxed sets" can take this a step further and may include more extensive amounts of collateral materials that are designed to be of interest to the consumer.

On-line media content delivery services can replicate many aspects of an interaction with physical media content, and in some cases enhance it by providing, for example, interactive features, and/or more comprehensive information. However, while often satisfactory, such on-line experiences are very different from interaction with traditional physical media content and are not always well-suited to social settings involving a group of people. For example, a consumer and a few friends might be looking at the consumer's collection of CDs to decide which songs are going to be played on a home stereo. Each member of the group is pulling CDs off the shelf, looking at the song lists, reading the collateral materials, sharing materials with the others, and making suggestions as to the playlist. This kind of group social interaction, which consumers often highly value, is not typically achievable with user interfaces supported by PCs or other media rendering devices which tend to be configured for individual use.

In contrast to existing on-line content delivery, the present media token with pushbutton RFID tag enables a service to bridge the benefits of digitally delivered media content with the characteristics provided by traditional physical media that consumers often desire. The media token provides a way to control playback of associated media content using an inexpensive physical vehicle that consumers may hold in their hands, look at, and share with others.

Figure 1:
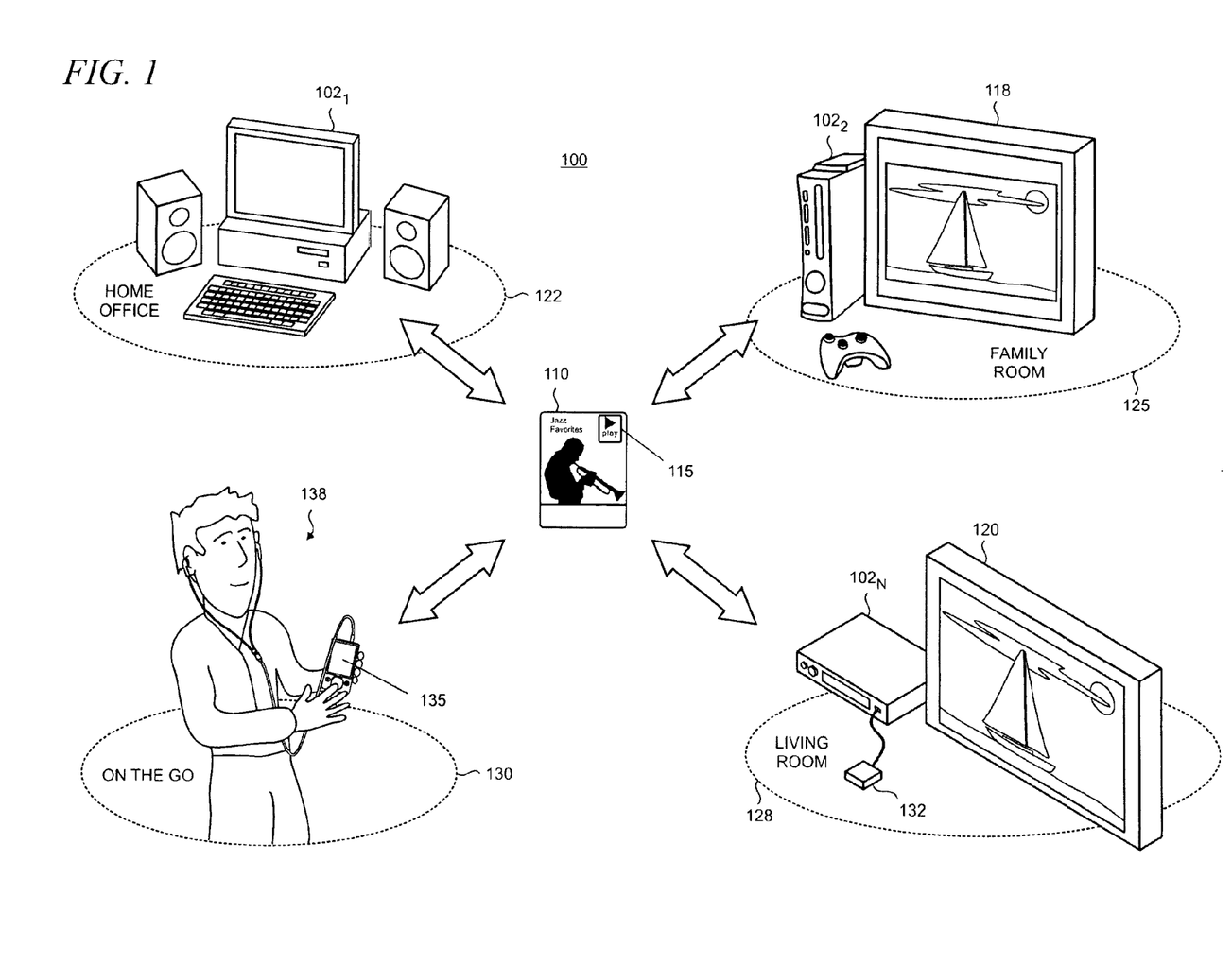
FIG. 1 shows an illustrative environment including a variety of media content rendering client devices with which an illustrative media card with a pushbutton RFID tag may be operated.

Turning now to the drawings, FIG. 1 shows an illustrative environment 100 including a variety of media content rendering devices $102_{1,2...N}$ with which an illustrative media token with a pushbutton RFID tag may be operated. In this particular example, the media token is embodied as a media card 110 which is approximately sized as a conventional playing card and includes a pushbutton RFID tag 115 that is configured as a passive tag. Details of the pushbutton RFID tag 115 are shown in FIGS. 3-8 and described in the accompanying text.

Media tokens may also be formed using other objects to which a pushbutton RFID tag is affixed or incorporated. Examples include greeting cards, instruction manuals, books, notebooks, pamphlets, magazines and other printed matter. Media tokens may also include traditional promotional giveaways or gift items such as pens, mugs, toys, mouse pads, flashlights, keychains and fobs, small USB (Universal Serial Bus) thumb drives, etc. Articles of clothing and other apparel can also be utilized as media tokens in some applications, as can trophies and awards, for example.

The media content rendering devices 102 are representative of a variety of electronic devices that can be connected to the Internet and can render media content such as audio and video. Such media content commonly includes, for example, music, audio books, podcasts, images like photographs, video in the form of television programs, movies, music videos and the like. The devices include a media center-type PC $102_1$, a game console $102_2$ which is operatively coupled to a television 118, and a set-top box $102_N$ which is operatively coupled to a television 120. Each device 102 operates as a client device for a media content service that is accessed over a network such as the Internet, as described in more detail below in the text accompanying FIG. 9.

In many typical scenarios, the client devices 102 will be located in different rooms of a home. Thus, for example, the PC $102_1$ is located in a home office 122, the game console $102_2$ is in the family room 125, and the set top box $102_N$ is set up in the living room 128.

In this example, the PC $102_1$ and game console $102_2$ are each further configured to include RFID reader functionality that is internally integrated. The set-top box $102_N$ utilizes an external RFID reader 132 that is coupled, for example using a USB connection.

A portable media player 135 is used by a consumer 138 in the illustrative environment 100. As indicated by reference numeral 130, the consumer 138 may use the portable media player 135 while on the go and in various locations. The portable media player 135 is representative of the variety of portable electronic devices that are available that can play audio, video, or both including MP3 players (Moving Pictures Expert Group, MPEG-1, audio layer 3), portable multimedia players, pocket PCs, smart phones, mobile phones, handheld game devices, personal digital assistants ("PDAs"), or other types of electronic devices that can store and render media content. In this example, the portable media player 135 is further configured to include an internally integrated RFID reader.

As indicated by the arrows in FIG. 1, the media card 110 may wirelessly communicate with the client devices 102 and portable media player 135 using RF signals that are exchanged between the pushbutton RFID tag 115 and the respective RFID readers used with the client devices 102. More details about the wireless RF communication are provided in the text accompanying FIG. 7.

In this example, the portable media player 135 is arranged to be operatively couplable with the PC $102_1$ using a synchronization process by which data may be exchanged or shared between the devices. The synchronization process implemented between the PC $102_1$ and portable media player 135 typically enables media content to be downloaded from an on-line source to the PC $102_1$ and then transferred to the portable media player 135.

Figure 2:
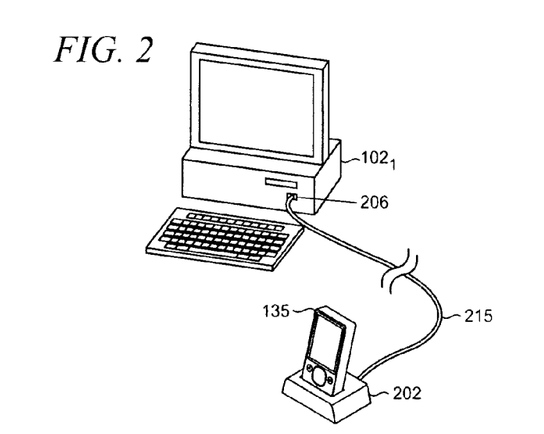
FIG. 2 shows an illustrative arrangement where a portable media player is synchronized with a PC (personal computer)

FIG. 2 shows the portable media player 135 as typically inserted into a dock 202 for synchronization with the PC $102_1$. Dock 202 is coupled to an input port 206 such as USB port (Universal Serial Bus) with a synchronization ("sync") cable 215, in this example. In alternative arrangements, the portable media player 135 may be coupled directly to the sync cable 215 without using the dock 202. In addition, other arrangements may also be used to implement communications between the portable media player 135 and PC $102_1$ including, for example, those employing wireless protocols such as Bluetooth, or Wi-Fi (i.e., the Institute of Electrical and Electronics Engineers, IEEE 802.11 standards family).

Figure 3:
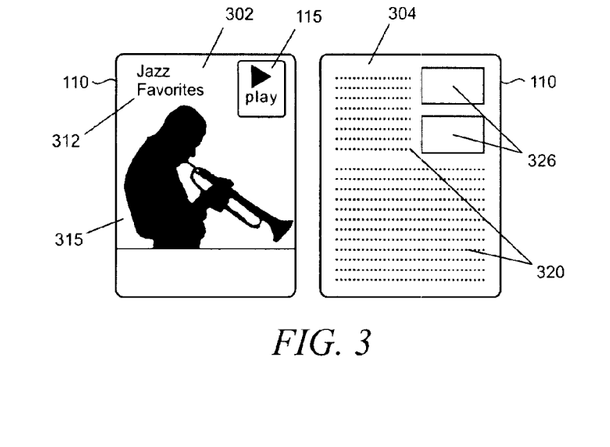
FIG. 3 shows the front and reverse sides of an illustrative media card in which a pushbutton RFID tag is incorporated.

FIG. 3 shows the front side 302 and reverse side 304 of the illustrative media card 110 in which a pushbutton RFID tag 115 is incorporated. The front side 302 of the media card 110 typically includes an area that may be used to highlight or describe the media content that is associated with the card 110 such as a title 312 and/or artwork 315. In this example, the media content associated with the media card 110 is a jazz album that includes multiple tracks of music. However, it is emphasized that the associated media content is not limited to music, nor does it need to include multiple pieces of content such as music tracks. For example the associated media content could be a video of a feature film, a collection of music videos, or comprise one track of music (e.g., a "single"). In other arrangements, the media content associated with the media card 110 may be used for promotional purposes and could include a short trailer of a feature film.

As shown in FIG. 3, the pushbutton RFID tag 115 is located in the upper right-hand corner of the media card 110. However, this location is merely illustrative, and the tag 115 may be located in various other positions on the card 110 to meet the requirements of a particular implementation.

The reverse side 304 of the media card 110 typically includes an area that may be used to provide additional information that may be of interest to a consumer. For example, text 320 and/or graphics 326 can be included to list tracks, provide information about the artist and band, and the like. The elements provided on the reverse side 304, their layout, and specific content included can be expected to be selected as a matter of design choice and will typically vary.

Figure 4:
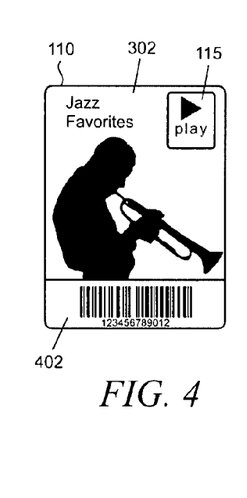
FIGS. 4, 4A, and 4B show illustrative alternative configurations for the media card in which a bar code, raised Braille markings, and promotional offers, respectively, are included.
Figure 4A:
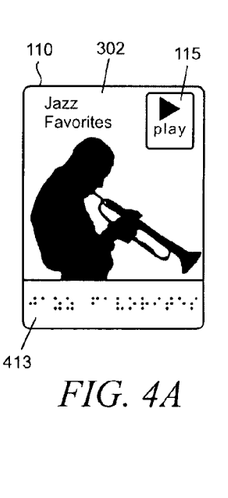
Figure 4B:
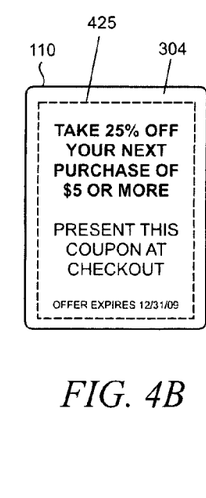

The media card 110 may also be alternatively configured to convey a variety of other kinds of information. For example, as shown in FIG. 4 a UPC (Universal Product Code) barcode 402 is printed on the front side 302 of the media card 110. In FIG. 4A, raised Braille markings 413 which spell out "Jazz Favorites" are included. Promotional and marketing messages, advertising, and offers such as coupon 425 which is provided on the reverse side 304 may also be provided by the media card 110.

Figure 5:
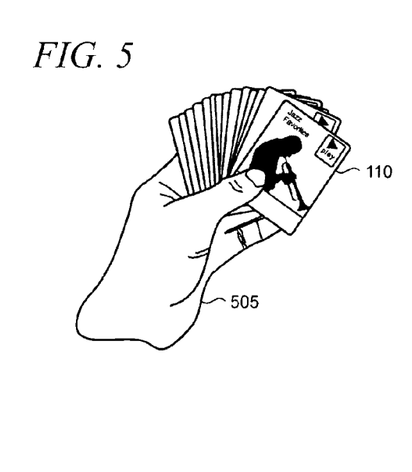
FIG. 5 shows an illustrative arrangement in which a plurality of media cards are held.

In many applications, the media card 110 will be arranged using low-cost materials such as thermoplastics, or plastic-coated card stock. The media card 110 will also typically be sized so that multiple cards can be comfortably held and sorted through as easily as a deck of playing cards. For example, as shown in FIG. 5, a group of media cards, including the representative media card 110, can be fanned out in the hand 505 of a consumer like playing cards. Media cards can also be conveniently placed in a shirt pocket for travel or compactly stored in a collection.

A media token such as the media card 110 supports a variety of different physical distribution models and channels compared with on-line-only media delivery. These include retail sale where media tokens can be sold in a similar manner as conventional physical media such as CD and DVD. However, as the media token is not a container for media content, there are more ways to produce it for retail distribution. For example, a media card can be produced at the time of sale where the GUID is locally associated with the particular media content and then the card is printed with the appropriately matched text and/or graphics. Such on-demand production may be supported by retail personnel, or using self-service kiosks, for example.

The present media token also presents new options for promotional distribution of media content which would previously have been uneconomical or difficult to target. For example media tokens may be used in direct mail campaigns, or handed out at live concerts where a consumer may be given access to a sample recording from the concert soundboard. In this case perhaps the media token includes information or a coupon that may be redeemed to purchase a complete recording, video, or related merchandise at a special price.

Media tokens also provide a new way to support viral marketing. Here, influencers' physical social networks are a natural nexus for distribution of limited-use or special promotional materials which include or incorporate a media token. By comparison to traditional promotional materials, media tokens are less expensive and as a result are more disposable and more easily shareable than traditional "white label" or other existing preview or sample media types.

Figure 6:
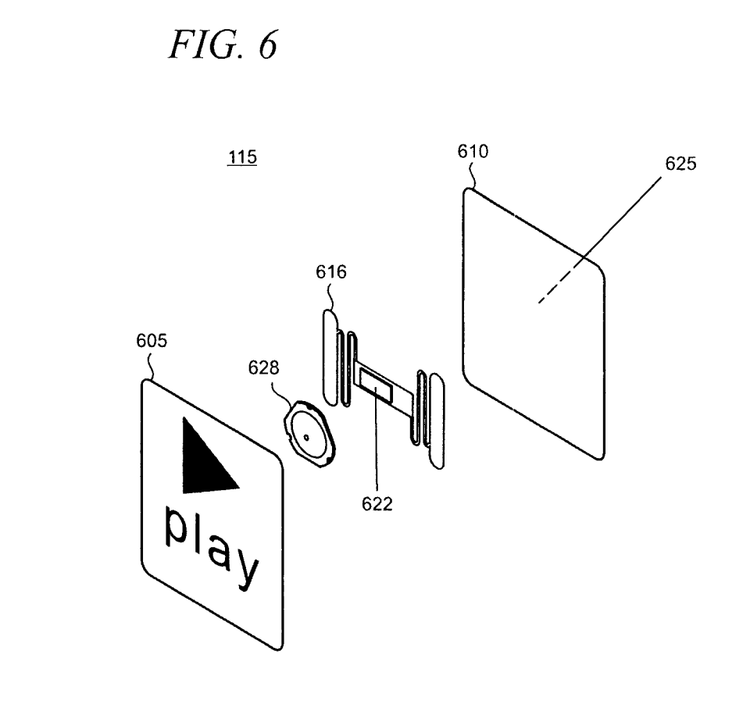
FIG. 6 shows an exploded isometric view of an illustrative present pushbutton RFID tag.

The pushbutton RFID tag 115 is shown in exploded isometric view in FIG. 6. As noted above, the pushbutton RFID tag 115 is arranged as a passive RFID tag. The pushbutton RFID tag 115 can be arranged in compliance with the UHF (Ultra High Frequency) Class 1 Generation 2 protocol (commonly known as the "Gen 2" standard) published by EPCglobal which covers passive-backscatter RFID systems operating in the 860 MHz-960 MHz frequency range.

As shown in FIG. 6, the pushbutton RFID tag 115 comprises a front substrate 605 and back substrate 610 which sandwich a layer that includes an antenna 616 having a folded dipole, and RFID integrated circuit (i.e., "chip") 622. The substrates will typically be formed from a thin and flexible material such as thermoplastic (e.g., polyurethane, polyethylene terephthalate, polypropylene, or polyester) or paper. The front substrate 605 includes markings (e.g., an icon and the word "Play") to indicate to the consumer that the tag 115 may be pressed to start playback of the media content that is associated with the tag.

The reverse side 625 of the back substrate may include a layer of pressure-sensitive or other type of adhesive to enable the pushbutton RFID tag 115 to be affixed to the media card 110. Alternatively, the tag 115 may be laminated to the media card 110.

A pushbutton actuator 628 is positioned in front of the antenna 616 and chip 622. In this example, the actuator 628 is a momentary contact, dome-type tactile switch (i.e., a "tact" switch) which is typically encapsulated within layers of polyester and acrylic-based adhesives in what is termed a membrane switch configuration.

The RFID chip 622 is arranged to store data, and in particular, a globally unique identifier ("GUID") to identify the pushbutton RFID tag 115 and the media card 110 with which it is incorporated. In many applications, the RFID chip 622 will be arranged with 32 and 128 bits of memory, but other memory values may also be used.

Figure 7:
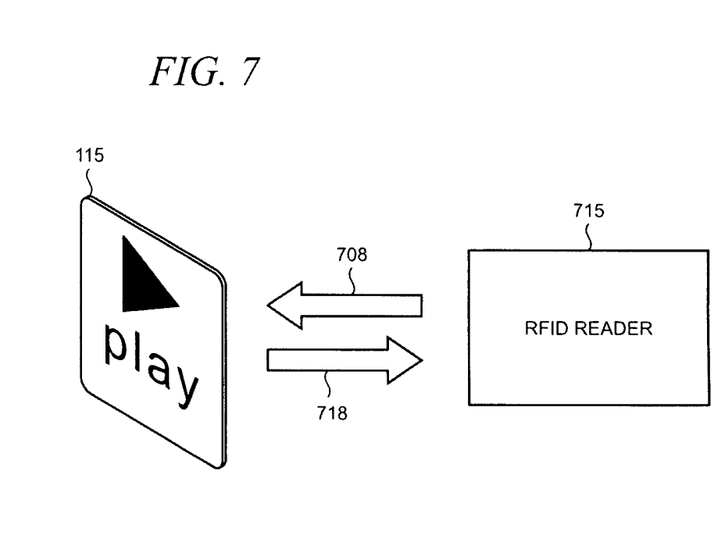
FIG. 7 highlights the interaction between the pushbutton RFID tag and a passive RFID reader.

The pushbutton RFID tag 115 does not include an internal power supply, and consequently must rely on power emitted by an RFID reader in order to transmit data. As indicated in FIG. 7, the antenna 616 in the pushbutton RFID tag 115 absorbs an RF signal (as shown by arrow 708) which is emitted by an RFID reader 715 (i.e., as used by the client devices 102 and the portable media player 135 as shown in FIG. 1 and described in the accompanying text). The RF reader 715 is normally arranged to continuously scan for RFID tags by continuously emitting the RF signal.

The RF signal includes a modulated portion along with periods of an unmodulated carrier. An RF voltage that is developed across the antenna's terminals during the unmodulated period is converted to DC (direct current) which is used to power the RFID chip 622. The RFID chip 622 modulates the RF signal (typically by varying the RF input impedance) that is sent back to the RFID reader 715 (as shown by arrow 718). The RFID reader 715 converts the modulated RF signal into digital data to resolve the GUID.

The read range for the pushbutton RFID tag 115 can be expected to vary depending on the implementation conditions including the size and configuration of the antenna 616, the power of the RFID reader 715, and interference from other RF devices, and so on. However, read range generally increases with the frequency of operation so that the effective range may be around three meters for the RFID readers that are used with the client devices 102 in FIG. 1. By comparison, the RFID reader that is incorporated in the portable media player 135 will typically be configured to support a shorter read range, for example up to around several centimeters.

In accordance with the principles of the present arrangement, the RFID chip 622 is normally disconnected from the antenna 616. In this unactivated (i.e., "off") state, the pushbutton RFID tag 115 is transparent to the RFID reader 715 and its GUID will not be read when scanned. When a consumer presses the button on the RFID tag 115, the actuator 628 couples the antenna 616 to the RFID chip 622 so that the tag gets powered up and becomes activated. The RFID chip 622 can return the modulated RF signal back to reader 715 so that the GUID may be read.

Figure 8:
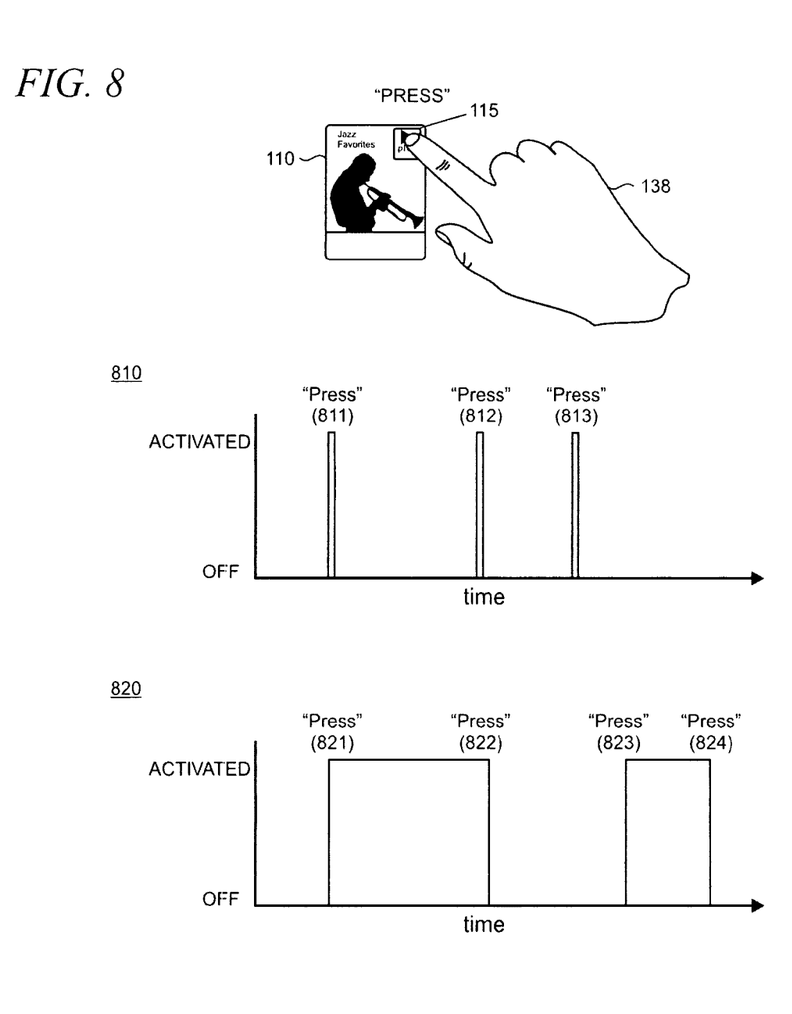
FIG. 8 shows two alternative activation behaviors of the pushbutton RFID tag.

Several different activation behaviors may be alternatively implemented, as shown in FIG. 8. In the first graph 810, each press by the consumer 138 on the pushbutton RFID tag 115 causes the tag to be momentarily activated. So, for example, as the consumer 138 moves from room to room in the environment 100 (FIG. 1) with the media card 110 in hand, each press on the pushbutton RFID tag 115 will cause each respective RFID reader in the client devices 102 to read the GUID. Thus, for example, the consumer 138 can play the media content associated with the media card 110 (i.e., "Jazz Favorites") on the PC $102_1$ with a first press (811), move to another room and play the content on the game console $102_2$ over the television 118 with a second press (812). The consumer might then place the media card 110 near the portable media player 135 to play the content on the player with a third press of the pushbutton RFID tag 115 (813).

In the second graph 820 shown in FIG. 8, a press by the consumer 138 on the pushbutton RFID tag 115 causes the tag to be activated and stay activated until another press of the button turns it off. With this activation behavior, which termed is "code switching," for example, the consumer 138 with a press (821) of the pushbutton RFID tag 115 can activate it within RFID reader range of the PC $102_1$ and begin playback of the jazz content in the home office 122. As the RFID tag 115 stays activated, when the consumer 138 moves to the family room 125 with the media card 110 in his pocket, the jazz music will appear to follow the consumer because the RFID reader in the game console $102_2$ will scan the tag and resolve the GUID to begin playback once the tag comes within range. This activation behavior will be discontinued with a second press (822) on the pushbutton RFID tag 115. Code switching may be typically implemented by configuring the actuator 628, or employing logic in the chip 622, or using a combination of both switch configuration and logic.

The consumer 128 can implement the "music-follows-me" feature again with another press (823), for example, to begin playback on the set-top box $102_N$ in the living room 128 and have it continue on the portable media player 135 when the consumer goes out for a walk. Another press (824) of the pushbutton RFID tag 115 deactivates the feature so that the music will not begin playing on the PC $102_1$ when the consumer gets back from his walk and goes into the home office to check his e-mail.

The "music-follows-me" example also highlights a feature that the present arrangement provides where a single media token may enable the dynamic delivery of media content having variable resolution, sampling rates, or other characteristics. An illustrative example is where the media content is a video such as a music video or movie. In this case, it may be anticipated that the consumer will have client devices that have varying display capabilities. For example, the PC $102_1$ may use a comparatively low resolution monitor, while the game console $102_2$ is connected to a high-resolution widescreen monitor, and the portable media player 135 has a small built-in display. As the consumer moves from room to room, or switches to using the portable media player 135, the media content delivered to the device can be dynamically tailored to the appropriate resolution.

Figure 9:
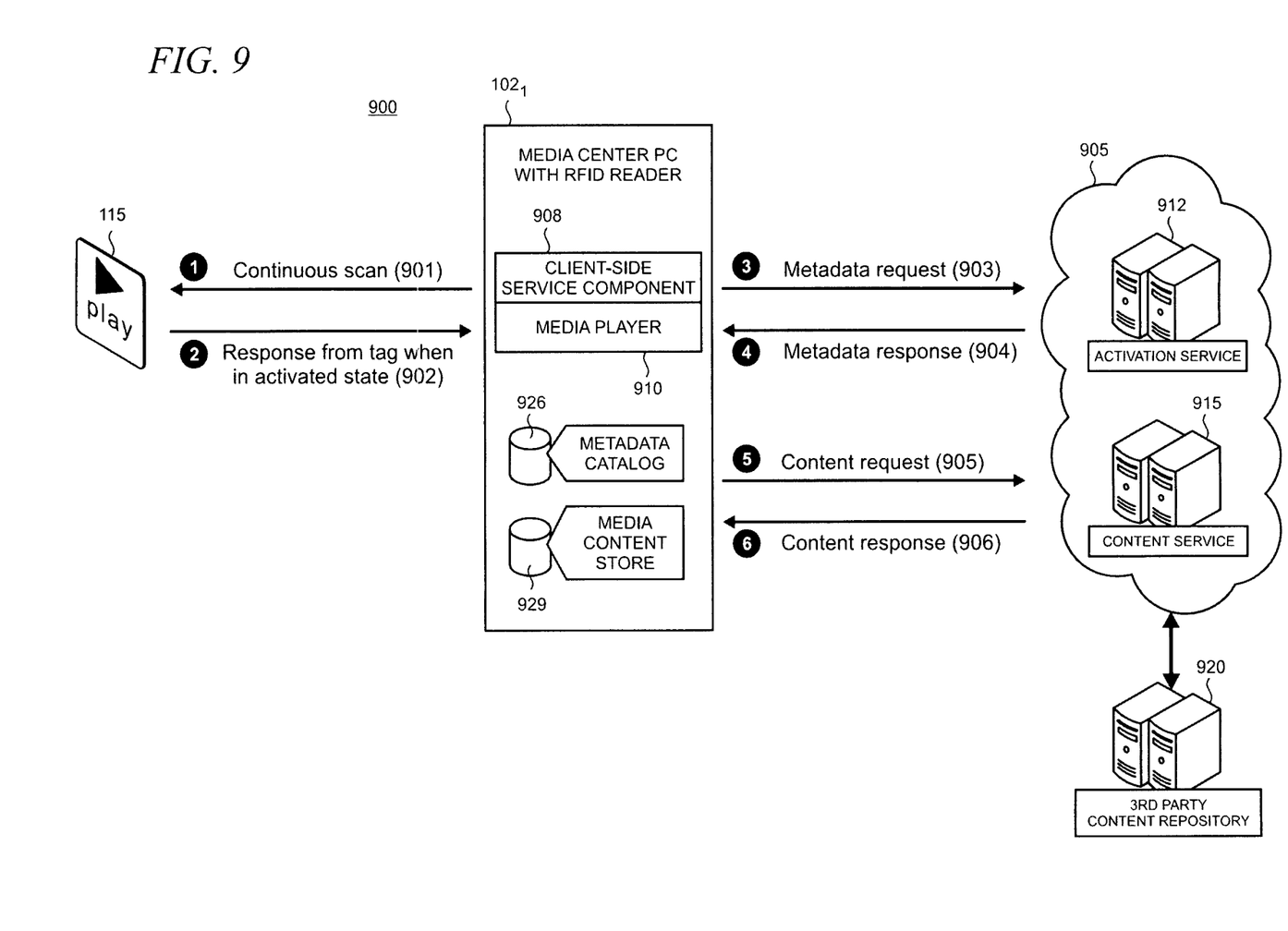
FIG. 9 shows an illustrative media content delivery service architecture that works with a media card having a pushbutton RFID tag.

As noted above, a media content delivery service provides the actual content to the client devices 102 that is associated with the media card 110. FIG. 9 shows an illustrative architecture 900 for such a media content delivery service. While FIG. 9 shows the PC $102_1$ as a representative client device, it is noted that the architecture 900 is operative with other client devices shown in FIG. 1 and described in the accompanying text.

In this example, the media content delivery service 905 is configured to be accessed by the client devices 102 shown in FIG. 1 over public networks such as the Internet as a "cloud-based" service. The media content delivery service 905 includes an activation service 912 and a content service 915. It is noted that the activation service 912 does not necessarily need to be associated with a specific content service. For example, third-party content repositories, as indicated by reference 920, may be optionally utilized as shown in FIG. 9.

As shown, PC $102_1$ is configured with a local client-side service component 908 which supports interaction with the service 905, as well as with a media player 910. In some applications, the client-side service component is responsible for enforcement of applicable usage policy or DRM protection for the media content.

In an illustrative usage scenario, architecture 900 is configured to implement a method for controlling delivery of the media content from the service 905 to the PC $102_1$.

The first step in the method (indicated by reference numeral 901 in FIG. 9) involves the PC $102_1$ implementing a continuous scan for media cards having a pushbutton RFID tag that is within range of its RFID reader. The second step (902) includes the PC $102_1$ receiving the modulated RF signal which includes the GUID from the RFID tag 115 when it is activated by a consumer pressing the button.

At step three (903), the PC $102_1$ makes an activation request to the activation service 912. An illustrative form of the request is:

<PlayRequest deviceid="my_media_center" tagid="GUID"/>.

At step four (904), the activation service 912 responds to the request with information such as metadata about the media content that is associated with the GUID. An illustrative form of the response is:

<PlayResponse><Location href="uri"/><Usage Policy . . . /></PlayResponse>.

Metadata may include a variety of information that describes or is related to the media content such as track name, track number, album name, artist, genre, release year, and audio format in the case of music. For video, the metadata may include title, creator, release date, and video format. In some implementations, the metadata may include URLs (Uniform Resource Locators), or links, for accessing related content such as lyrics, cover artwork, artist information, concert information, reviews, interviews with the artists, actors, and directors, commentary, bloopers, behind the scenes footage, outtakes, remixes, and similar kinds of content. For both audio and video, the metadata may also include a description of the applicable usage policies or a URL to such policies. Consumers may view metadata, or interact with related content through user interfaces that are typically hosted by the client devices 102. For example, the client-side service component 908 will typically include a user interface, or the consumer may utilize a web browser in some cases.

At step five (905), the PC $102_1$ requests content from the content service component 915. An illustrative form of the request is:

<ContentRequest><Location href="uri"/><Usage Policy . . . /></ContentRequest>.

At step six (906), the content service 915 delivers the media content that is associated with the media card 110 (as identified by the GUID read from the RFID tag 115) which in this example is the album "Jazz Favorites." The delivered media content, and in some cases the associated metadata, may be subject to a particular usage policy which may specify, for example, that DRM protection is applicable. The usage policy will typically be stored as metadata in the metadata catalog 926.

The usage policy applied to the delivered media content can vary by implementation. Illustrative examples include:
1) Unlimited plays on any device (e.g., client devices 102 and portable media player 135) with unlimited retention of the media content;
2) Unlimited plays and retention on a first client device, but limited plays with no retention on a second client device, and limited retention on portable devices;
3) Limited plays on any device;
4) Limited plays on a first device only;
5) Single play (i.e., one-time-only);
6) "Golden Ticket" (i.e., rights which may be redeemed to access and/or use other media content or other services).

Formulation of a usage policy that is implemented at a local client device 102 may take solely the GUID read from the pushbutton RFID tag 115, or use the GUID in combination with other identifying data such as a customer account ID or login. For example, a media content delivery service may be arranged using a registration or subscription-based business model where levels or tiered subscriptions are utilized. In those cases, a usage policy may include fewer limitations for a consumer who subscribes to a higher level of service.

In some implementations, a "proof-of-purchase" model may be utilized in which possession of a media card 110 is taken to represent ownership by the consumer 138 of the associated media content (e.g., the album of "Jazz Favorites"). In this situation, the physical presence of the media card 110, as evidenced by the scan of the GUID from the pushbutton RFID tag 115, may confer the same unlimited rights to playback and retain the media content that is enabled by owning a traditional CD that contains the content. Under this model, media content and related metadata is delivered to respective local metadata catalog and content stores 926 and 929 which may be implemented for example, on the hard disk of PC $102_1$ where the content and metadata is cached for subsequent use. In other implementations where rights of playback and retention are more limited under the applicable usage policies or DRM protection, media content may only be streamed to a client device 102, but not stored locally.

An extension of the proof-of-purchase model would be to limit playback and retention when the media card 110 is absent. For example, the consumer 138 may have purchased a media card 110 which enables the associated media content to be downloaded and stored locally at a client device 102. As noted above, when the media card 110 is present, normally the consumer 138 would be able to play and transfer the media content between devices without restriction. However, should the consumer 138 lend the media card 110 to a friend, then the client device 102 could, for example, be restricted from playing the media content from the local store altogether, or may have a limit on the play count. When the friend returns the media card 110, then the unlimited rights are restored.

In this regard, the media card 110 supports a usage model that is very similar to traditional media where its physical possession enables playback and lack of possession limits playback. As such a model can meet consumer's expectations as to what is reasonable and fair for purchased media content, the usage policies and DRM that are applicable to the media content become more transparent. In addition, using the media card 110 makes it easy for the consumer 138 to access and enjoy media content without necessarily needing to understand the mechanics behind its digital delivery. Indeed, some consumers will not even care or make the distinction that the media card 110 is not itself a media content container. Instead, aside from the media content that is rendered with a simple press of a button, these consumers will simply enjoy the traditional physical interaction with content that is enabled by the media card 110.

Figure 10:
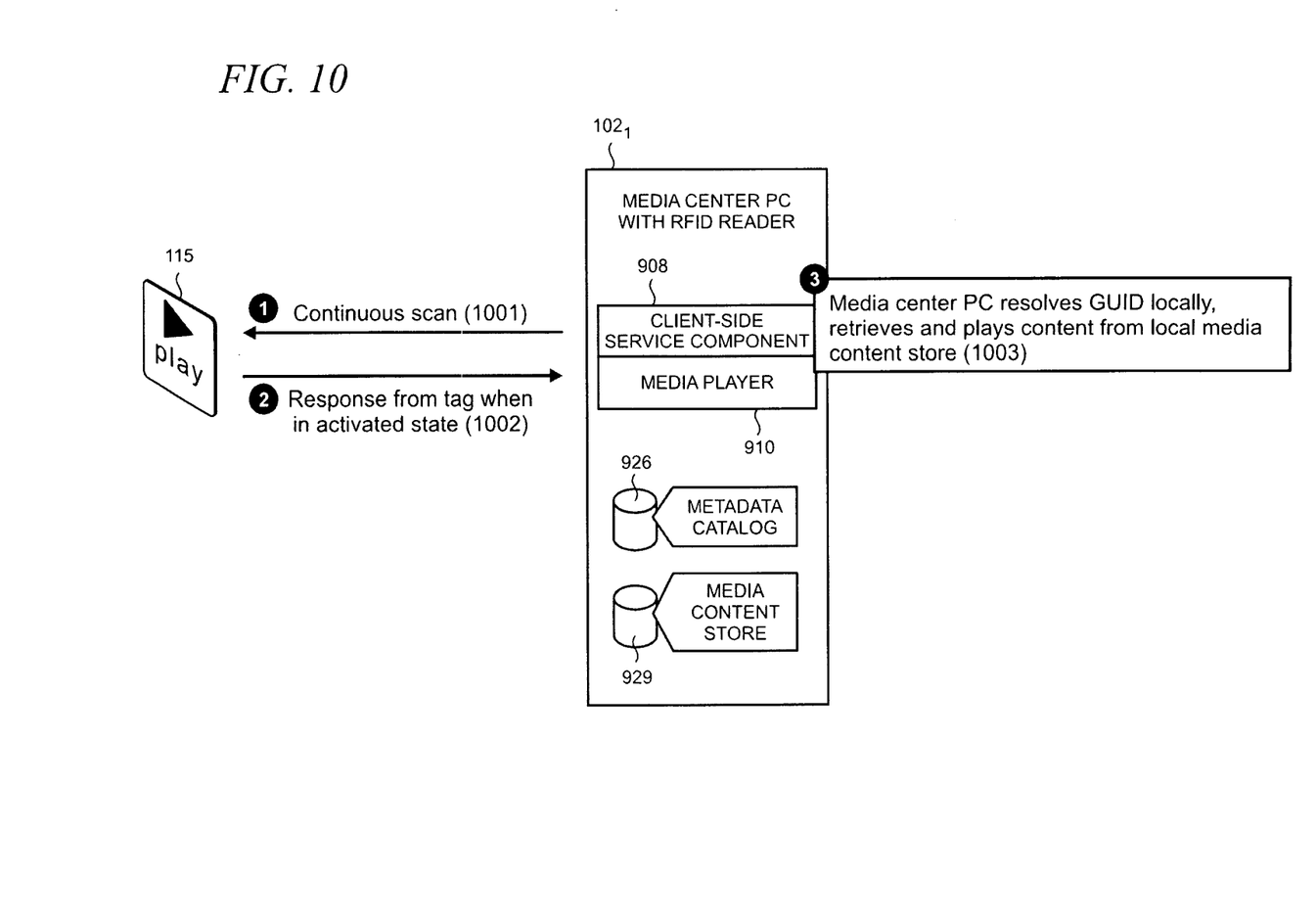
FIG. 10 shows an illustrative scenario in which media content is played locally in response to interaction with a media card with a pushbutton RFID tag.

In cases where the media content is locally cached in the media content store 929, subsequent requests for playback of the content may typically be handled locally at the client device. As shown in FIG. 10, a first step (1001) in an illustrative method involves the PC $102_1$ implementing a continuous scan for media cards having a pushbutton RFID tag that is within range of its RFID reader. The second step (1002) involves the PC $102_1$ receiving the modulated RF signal which includes the GUID from the RFID tag 115 when it is activated by a consumer pressing the button. At step three (1003), the PC $102_1$ resolves the GUID locally and plays the media content associated with the media card 110 (again the "Jazz Favorites" album) from the local media content store 929. Resolution of the GUID typically involves checking a local database associated with the metadata catalog 926 to identify applicable usage policy and locate the media content in the store 929.

Figure 11:
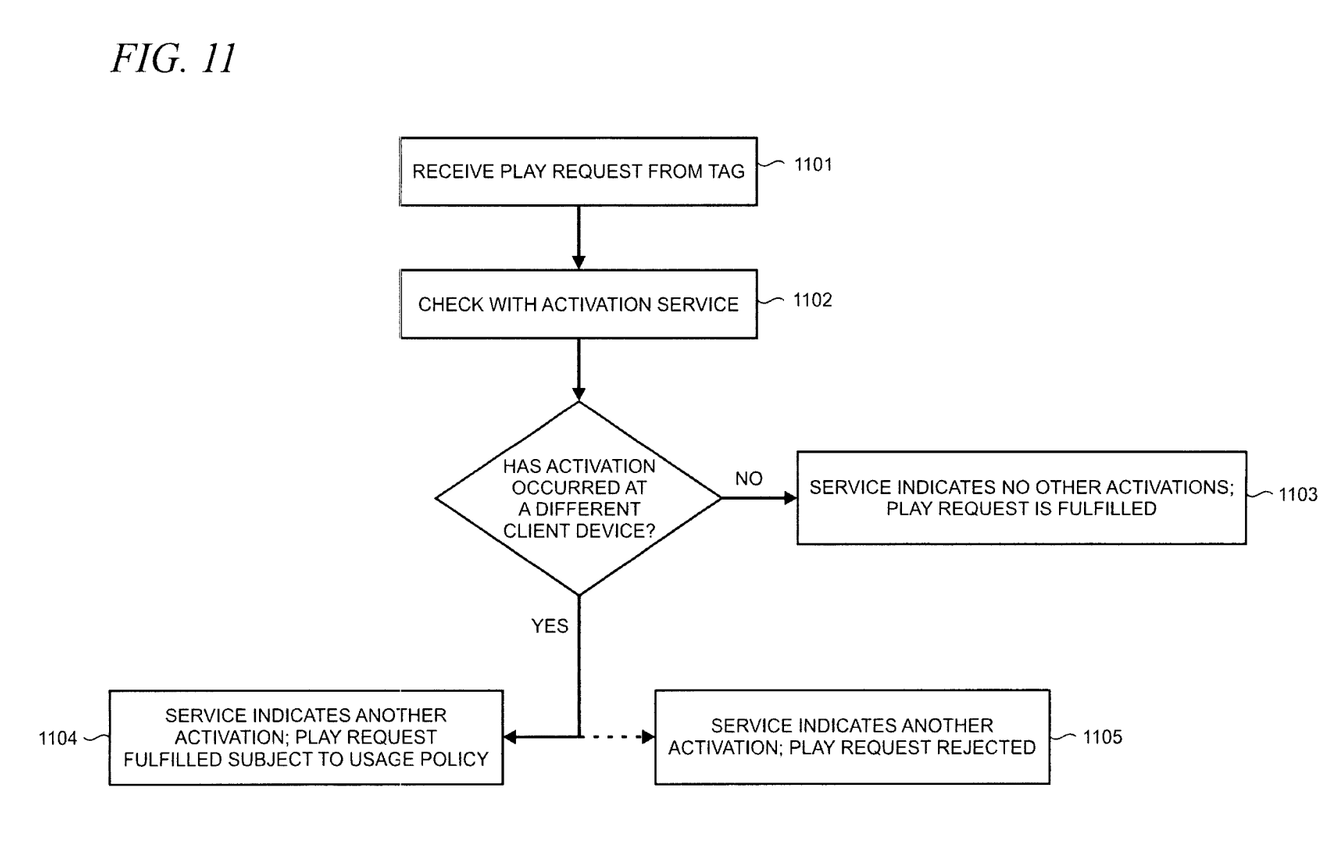
FIG. 11 shows a flowchart of an illustrative process that addresses RFID tag duplication.

To mitigate the possibility that a media card may be duplicated without authorization, the PC $102_1$ may be arranged to check with the activation service 912 (FIG. 9) for each subsequent play request. This activity is shown in the flowchart of FIG. 11. PC $102_1$ receives a play request from a pushbutton RFID tag (1101) and checks with the activation service 912 before granting the request (1102). If the activation service 912 determines that no other activation of an RFID tag with the same GUID has occurred on another client device, then it informs the PC $102_1$ which can then fulfill the play request (1103).

If the activation service 912 determines that an activation of an RFID tag with the same GUID has occurred on another client device, then it informs the PC $102_1$. PC $102_1$ can employ alternative techniques in response. It may fulfill the play request but subject it to a usage policy that, for example, restricts play count or other rights (transfer, retain, etc.) (1104). Alternatively, as indicated by the dashed line in FIG.

11, the PC 102₁ may reject the play request outright (1105). Because the usage policy can be provided by the service 905 and enforced by the local client device 102, there is more flexibility to tune the policy and its effects on the consumer to best deter unauthorized use and piracy. This flexibility is an example of an additional benefit provided by the present arrangement which contrasts with the rigid application of DRM that might be embedded in traditional physical media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An automated method for receiving media content from a service, the method comprising the steps of:
    using an RFID reader to scan an area in which an RFID tag having an encoded GUID may be located when the RFID tag is activated by manually activating a switch included with the RFID tag;
    reading the GUID from the RFID tag with the RFID reader when the RFID tag is in the area and the RFID tag is initially activated by user manipulation of the switch;
    sending the GUID to an on-line activation service in an initial contact so that media content associated with the GUID may be identified;
    receiving the media content associated with the GUID from an on-line media content service as a download in response to the sent GUID;
    storing the downloaded media content in a local store;
    receiving metadata including usage polices that govern rendering the downloaded media content in response to the sent GUID;
    storing the received metadata including usage policies in a local database;
    in response to a subsequent activation of the switch, performing a look-up in the local database to identify an applicable usage policy under which the downloaded media content is renderable; and
    rendering the downloaded media content from local storage in accordance with the identified applicable usage policy without subsequently contacting the on-line activation service.

2. The automated method of claim 1 in which the method includes a further step of receiving descriptive metadata or usage policy metadata that is associated with the GUID.

3. The automated method of claim 1 including a further step of transferring the media content to a device.

4. The automated method of claim 1 including a further step of caching the media content in a local store.

5. The automated method of claim 1 in which the method includes a further step of enforcing a usage policy when performing one of rendering the media content, storing the media content, or transferring the media content to a device.

6. The automated method of claim 5 including a further step of performing one or more look-ups in a local database to locate the media content in the local store and identify usage policy that is applicable to the media content.

* * * * *